United States Patent [19]

Brock

[11] Patent Number: 5,011,350

[45] Date of Patent: Apr. 30, 1991

[54] LOAD STABILIZING UNIT

[76] Inventor: Warren Brock, 5064-A N. Wishon, Fresno, Calif. 93704

[21] Appl. No.: 379,505

[22] Filed: Jul. 12, 1989

[51] Int. Cl.$^5$ ............................................. B61D 45/00
[52] U.S. Cl. .................................... 410/128; 410/122; 410/124
[58] Field of Search .................... 410/54, 94, 121, 122, 410/123, 38, 44, 48, 52, 124, 127, 128, 129, 135, 143, 144, 145, 153

[56] References Cited

U.S. PATENT DOCUMENTS

| | | | |
|---|---|---|---|
| 4,052,083 | 10/1977 | Lutz | 410/122 |
| 4,222,696 | 9/1980 | Guins | 410/124 X |
| 4,815,905 | 3/1989 | Garcia Jr. | 410/128 |

Primary Examiner—Joseph F. Peters, Jr.
Assistant Examiner—Virna L. Mojica
Attorney, Agent, or Firm—Townsend and Townsend

[57] ABSTRACT

A load stabilizing unit for mounting on the inner surface of a side wall of a vehicle or trailer. The stabilizing unit includes one or more side panels with each panel having a bracing device for releasably holding the panel against a load to be stabilized. In a preferred embodiment, the bracing device is a fluid piston and cylinder assembly located between the panel and the vehicle side wall. In another embodiment, a manual bracing can be used to hold a stabilizing panel in place in engagement with cargo items. The manual bracing includes a turnbuckle which can be adjustably connected to a panel so that the turnbuckle will have the proper length to hold the movable panel in its cargo stabilizing position at all times.

6 Claims, 3 Drawing Sheets

FIG.1
FIG.2
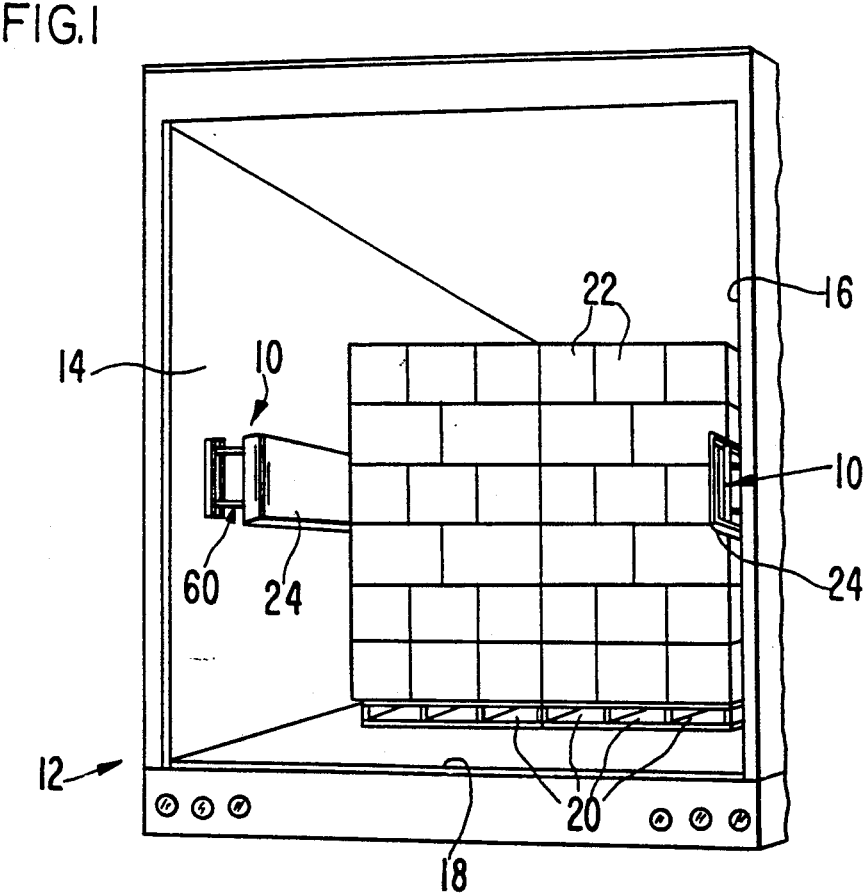
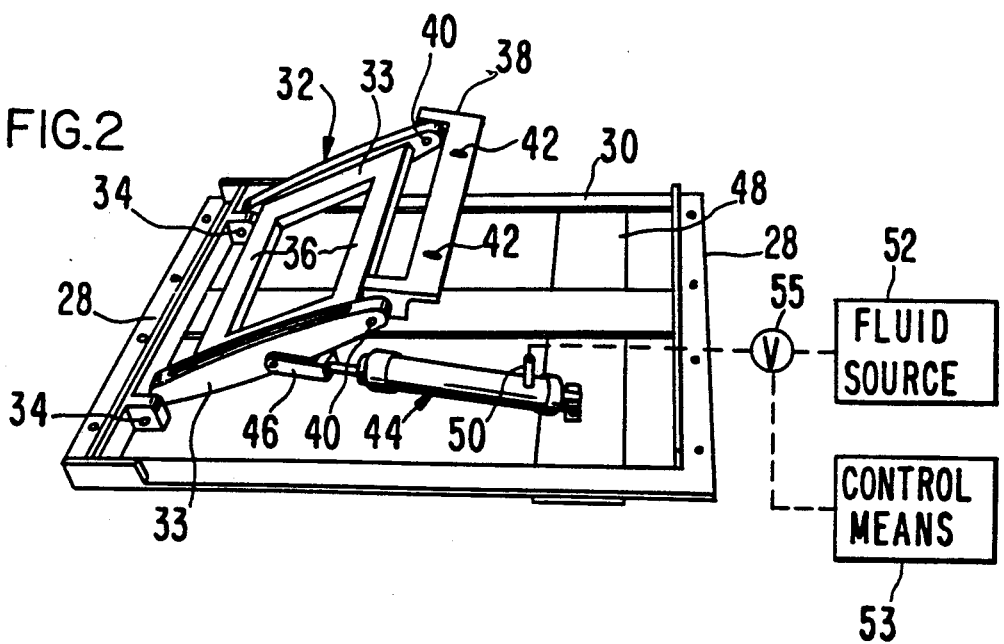

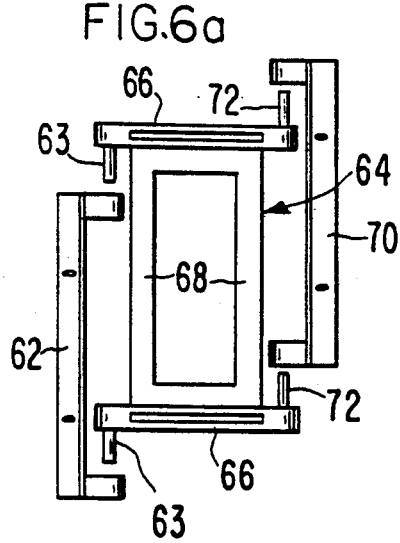
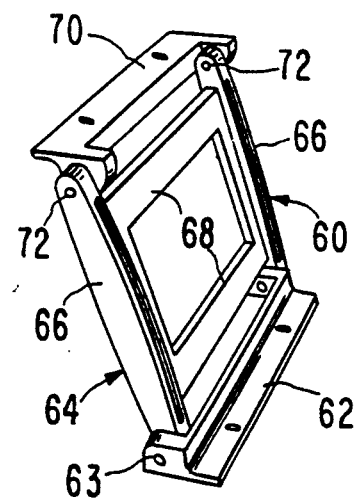
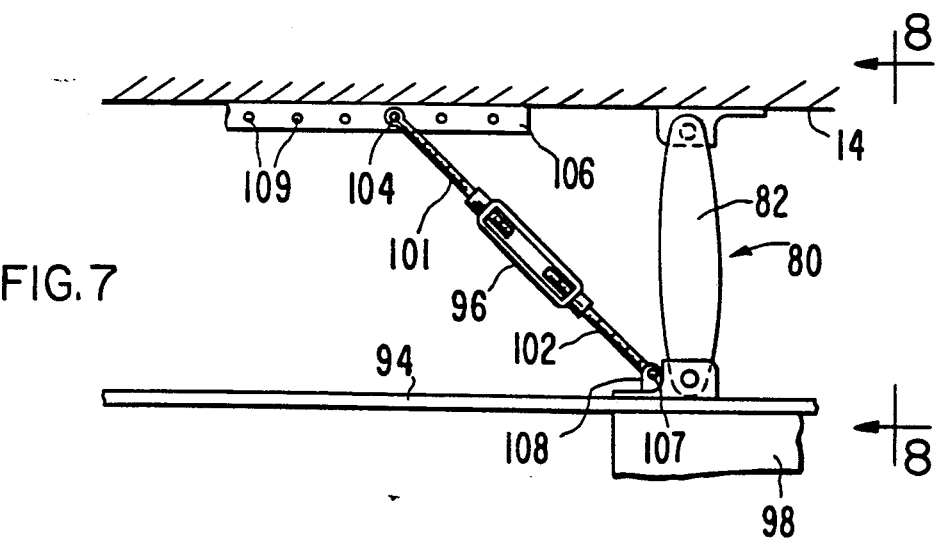
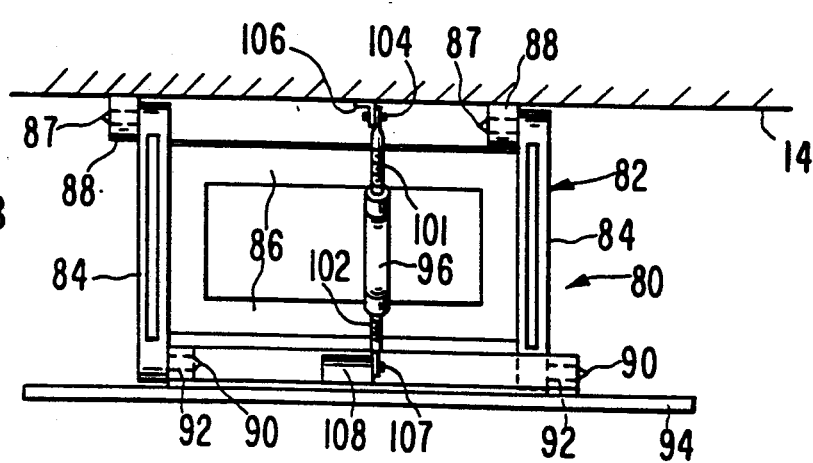

LOAD STABILIZING UNIT

This invention relates to improvements in stabilizing of cargo, such as cartons loaded on a trailer or a truck and, more particularly, to a load stabilizing unit which is controlled remotely from the load carrying zone.

BACKGROUND OF THE INVENTION

The stabilizing of movable cargo items, such as cartons containing bottles, cans or the like, have been known and used in the past. A disclosure relating to this concept is found in U.S. Pat. No. 4,815,905. In such disclosure, a load stabilizing means is described with respect to a cargo carrying portion of a trailer or vehicle having spaced inner and outer side walls. Stabilizing panels are provided at each side, respectively, of the vehicle and moved into and out of engagement with the cargo while parts of the stabilizing means are recessed in the hollow space between the inner and outer walls.

The side panels are provided at each side, respectively, of the vehicle and are moved into and out of engagement with the cargo while other parts of the stabilizing means are recessed in the hollow space between the inner and outer walls. The movement of the stabilizing panels is under the influence of a power device located below the vehicle and coupled with a shaft between the inner and outer walls to cause rotation of the shaft and thereby movement of the panels toward and away from the cargo.

While the stabilizing system of this patent is satisfactory for use with different types of cargo, it is complex in the sense that the power source for the stabilizing system is mounted below the vehicle, necessitating additional structure to couple the power source with the stabilizing panels. It is desirable that the stabilizing of cargo be simplified as much as possible and it is the aim of the present invention to so simplify the stabilizing of cargo items on a vehicle or trailer.

SUMMARY OF THE INVENTION

The present invention is directed to a stabilizing unit for mounting on the inner surface of one or both side walls of a vehicle or trailer adapted to carry cargo items, such as cartons containing canned, bottled or other products of many different types. The stabilizing unit includes one or more side panels with each panel having a bracing device for releasably holding the panel in its operative position against a load to be stabilized.

In a preferred embodiment, the bracing device is a fluid piston and cylinder assembly coupled with the panel and located between the panel and the vehicle side wall. Thus, the stabilizing unit is simplified in that it can be essentially self-contained within the region of the panel itself, assuming that a source of fluid under pressure can be connected to the piston and cylinder assembly from a location remote from the panel. When so coupled the fluid pressure source will supply fluid under pressure to the piston and cylinder assembly which will, in turn, move the panel or panels against the cargo to stabilize the cargo. This can be controlled by the operator of the vehicle or trailer from a location remote from the panel, such as in the trailer.

In lieu of using a remotely controlled fluid piston and cylinder assembly, a manual bracing can be used to hold a stabilizing panel in place and in engagement with cargo items. To this end, such a manual unit includes a turnbuckle which can be adjustably connected to a panel so that the turnbuckle will have the proper length to hold the movable panel in its cargo stabilizing position at all times. The turnbuckle can be changed in length when it is desired to move the panels to its retracted or stored position against the inner wall of the vehicle or trailer. Thus, the rigid connection provided by the turnbuckle between the wall and the panel can be removed to allow the panel to be pivoted back into its retracted or stored condition extending along the wall of the vehicle or trailer.

The primary object of the present invention is to provide an improved stabilizing unit for a vehicle or trailer for stabilizing cargo removably placed in the vehicle or on the trailer wherein the construction and operation of the stabilizing unit is simplified over prior structures to minimize the number of parts and the cost of production and installation without sacrificing the load stabilizing capability of the unit.

Other objects of this invention will become apparent as the following specification progresses, reference being made to the accompanying drawings for an illustration of the invention.

BRIEF DESCRIPTION OF THE DRAWINGS

FIG. 1 is a fragmentary, perspective view of the bed of a vehicle or trailer showing a load of cartons stacked on pallets and stabilized by shiftable panels on opposite sides of the cargo;

FIG. 2 is a perspective view of the bracing means for holding one of the panels into its load-engaging position, the bracing means being shown with a swingable bracket thereof in an intermediate position with respect to the load engaging position of the respective panel;

FIG. 6 is a perspective view of the support hinge having brackets coupled to the panel and to a side wall of the trailer;

FIG. 6a is an exploded view of the support hinge of FIG. 6;

FIG. 7 is a top plan view of a turnbuckle showing a manual brace for holding the panel in its extended position; and FIG. 8 is a view looking longitudinally of the turnbuckle and the panel coupled thereto.

DETAILED DESCRIPTION OF THE DRAWINGS

Figure 3:
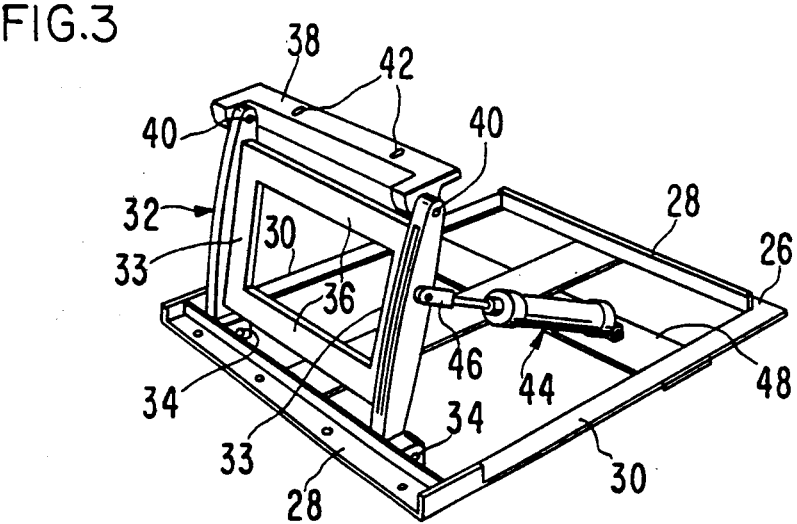
FIG. 3 is a view similar to FIG. 2 but showing the bracket in its almost a fully operative position.

The stabilizing system of the present invention is broadly denoted by the numeral 10 and is adapted to be mounted on a vehicle, such as a truck or a trailer 12 having a pair of side walls 14 and 16 and a bed 18 for supporting a number of pallets 20 on which is stacked cargo in the form of removable cartons 22 as shown in FIG. 1. The stabilizing unit 10 is provided for both side walls 14 and 16, and the unit 10 have side portions for respective side walls. Such side portions will be substantially identical so that the description of one side portion will suffice for the description of the other.

Each side portion of stabilizing unit 10 includes an elongated panel 24 which is typically of a suitable material, such as plywood or aluminum. Panel 24 is movable from a retracted position in which the panel is directly adjacent to the inner surface of the respective side wall to an expanded condition in which the panel engages the side of adjacent cartons 22 as shown in FIG. 1. Thus, the cartons will be stabilized and will not tip over as the vehicle 12 moves forwardly or in reverse. The panels 24, in effect, clamp the cartons in place and prevent their movement off the pallets 20.

Each stabilizing unit 10 includes a main frame 26 (FIGS. 2 and 3) which is adapted to be secured by fasteners, such as screws, to the inner surface of the corresponding side wall 14 or 16. Frame 26 includes a pair of spaced, side members 28 and a pair of vertically spaced end members 30. The side members 28 are provided with holes for receiving screws or other fasteners to secure the frame to the respective side wall 14 or 16.

A drive hinge 32 is pivotally mounted on main frame 26 by pins 34 on a respective side member 28 as shown in FIGS. 2 and 3. Drive hinge 32 is of a frame-like construction having sides 33 and ends 36, one of the ends 36 having a C-shaped bracket 38 thereon and pivotal about pins 40 on the adjacent ends of sides 33. Bracket 38 has holes 42 for receiving fasteners for securing the bracket 38 to the corresponding panel 24.

Figure 4:
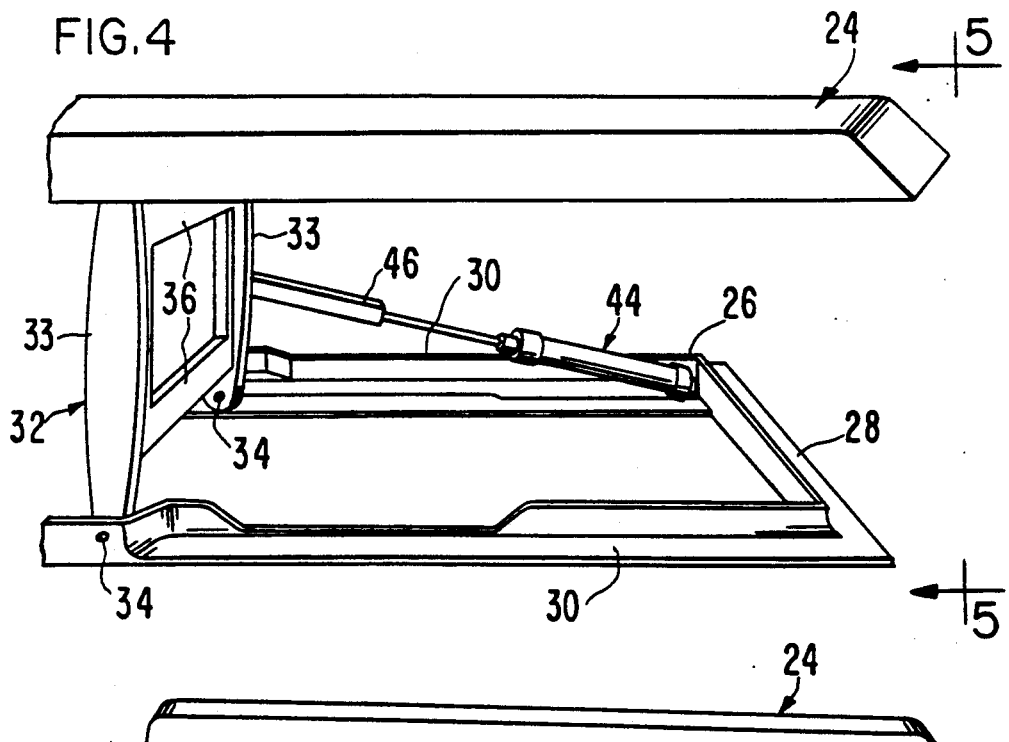
FIG. 4 is an enlarged, top plan view of the bracing means showing the panel in its fully extended position.
Figure 5:
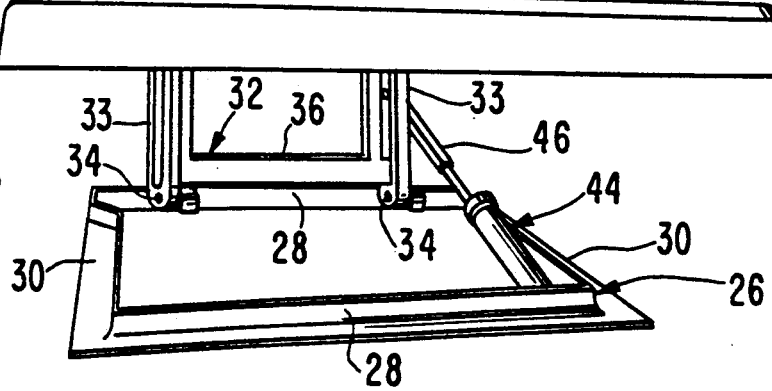
FIG. 5 is a perspective view of the panel looking along the length of the panel.

A fluid piston and cylinder assembly 44 has a clevis 46 pivotally mounted to one of the sides 33 and secured at the opposite end to a frame part 48 connected to or integral with frame 26. Actuation of the fluid piston and cylinder assembly causes the piston rod thereof to elongate to pivot hinge 32 from a retracted position adjacent to frame 26 to an expanded condition, such as shown in FIGS. 3-5 with the C-shaped bracket 38 being substantially spaced from the plane of frame 26. Actuation of piston and cylinder assembly 44 is by connecting a fluid inlet tube 50 to a source 52 of fluid under pressure, such as air under pressure.

To mount a side portion of stabilizing unit 10 on a side wall of vehicle 12, main frame 26 is secured to the inner surface of the side wall and bracket 38 is coupled to the panel 24 at a location near the midpoint of the panel. One or more support hinges 60, such as of the type shown in FIG. 6, can be used on each side of main frame 26 at a location spaced from the ends of the panel 24. Typically, for a panel 20 feet long, there will be a frame 26 and an assembly 84 between the ends of the panel and two spaced support hinges 60 on each side, respectively, of frame 26.

Each support hinge 60 shown in FIG. 6 includes a bracket 62 for attachment to the adjacent side wall 14 or 16. Hinge 60 further includes a frame-like, rectangular part 64 having parallel sides 66 and parallel ends 68 with a C-shaped bracket 70 pivotally mounted by pins 72 on the outer ends of part 64. Bracket 62 is pivotally mounted by pins 63 on part 64. Bracket 62 is secured to the side wall while the bracket 70 is secured to the respective panel 24. FIG. 6a shows the way in which pins 63 and 72 pivotally mount brackets 62 and 70 to part 64.

With panel 24 mounted as described above with respect to frame 26 of FIG. 2 and support hinge 60 of FIG. 6, fluid piston and cylinder assembly 44 is coupled to the frame 26 and support hinge 32 as shown in FIG. 2. Tube 50 or assembly 44 is coupled to a source 52 of fluid under pressure, and a suitable control means 53 is remotely controlled, such as in the trailer 12. A valve 55 is part of the control means 53 and alternately connects tube 50 with fluid source 52 or exhausts tube 50 to the atmosphere.

Normally, panel 24 will be against or adjacent to the respective side wall 14 and 16. A load of cartons or other cargo 22 will be moved into the vehicle and allowed to be supported on the bed 18 of the vehicle. When it is desired to stabilize the load, control means 53 is operated to operate valve 55 which couples tube 50 of each assembly 44 to the fluid source 52, causing each panel 24 to be moved outwardly of the respective side wall and against the sides of the cargo. The ends of the panels will also be moved outwardly with support hinges 60 between the main frame 26 and the ends of the panel.

The panels 24 remain against the cargo to stabilize the same so long as fluid is supplied under pressure to each assembly 44 (FIG. 2). FIGS. 3, 4 and 5 show the substantially maximum operating position of C-shaped bracket 38 which is attached to each panel and each assembly 44. FIG. 4 shows that the end of the piston and cylinder assembly 44 remote from drive bracket 32 can be coupled to frame 26 at a location other than that shown in FIGS. 2 and 3.

Another embodiment of the stabilizing unit of the present invention is shown in FIGS. 7 and 8 and is broadly denoted by the numeral 80. Stabilizing unit 80 includes a stabilizing support hinge 82 which is comprised of a pair of sides 84 interconnected by a rectangular plate 86 (shown only in FIG. 8). First ends of sides 84 are coupled by pins 87 to a bracket 88 secured to the side wall 14 or 16 of the vehicle. The opposite ends of sides 84 are coupled by pins 90 to a bracket 92 secured to the panel 94.

An adjustable turnbuckle device 96 is used to hold support hinge 82 in its expanded condition as shown in FIGS. 7 and 8 against the load defined by the numeral 98. Device 96 is threadably coupled to a pair of threaded shafts 101 and 102 pivotally secured by pin 104 to bar 106 and by pin 107 to ear 108 on support hinge 82 as shown in FIG. 7. Bar 106 has a number of spaced holes 108 therethrough for permitting adjustability in the length of the turnbuckle.

In use, after a load has been placed adjacent to the side wall 14 or 16, panel 94 is manually moved outwardly against a load as shown in FIG. 7 and pin 104 is placed in one of the holes 108 while pin 107 couples the corresponding end of shaft 102 to support hinge 82. Then, device 96 is rotated to force shafts 100 and 102 apart from each other, to thereby force the panel 94 to a greater extent against the load or cargo 98.

When it is desired to remove the stabilizing unit of FIGS. 7 and 8 from the cargo, device 96 is rotated to draw shafts 100 and 102 toward each other until the length of the turnbuckle is such that pin 104 can be removed from one of the holes 108 thereby separating the turnbuckle from bar 106 and thereby allowing panel 94 to pivot toward the adjacent corresponding side wall so that the cargo 98 can be removed from the vehicle.

What is claimed is:

1. A stabilizing unit for a load carried on a vehicle having a side wall with an inner surface comprising:
   a main frame adapted to be secured to the inner surface of the vehicle side wall, said main frame having a pair of side members;
   a drive hinge having a pair of sides and pivotally mounted at one of said sides on one side member of the main frame;
   a load stabilizing panel;
   means pivotally coupling the panel to the other side of the drive hinge for movement from a retracted position in which the panel is adjacent to the inner surface of the side wall to an operative position spaced inwardly from the inner surface of the side wall against a load adjacent thereto; and extensible means coupled with the drive hinge near the other side thereof and to the main frame near the other side member of the main frame for releasably holding the panel in its operative position.

2. A load stabilizing unit as set forth in claim 1, wherein said holding means includes a fluid piston and cylinder assembly.

3. A load stabilizing unit as set forth in claim 1, wherein said extensible means includes a fluid piston and cylinder assembly pivotally secured at one end thereof to the drive hinge at a location intermediate the sides thereof, said assembly being pivotally mounted at the opposite end thereof to the main frame.

4. A load stabilizing unit as set forth in claim 3, wherein said main frame has a pair of opposed ends, and a frame part interconnecting the ends, said opposite end of the assembly being pivotally coupled to the frame part.

5. A load stabilizing unit as set forth in claim 1, wherein said holding means includes a turnbuckle device pivotally coupled at one end thereof to the drive hinge and having adjustable means for pivotally mounting the opposite end of the turnbuckle device to the main frame.

6. A load stabilizing unit as set forth in claim 5, wherein said adjustable coupling means includes a bar having a number of spaced holes therethrough, said pivot means including a pin receivable in any one of said holes for adjustably mounting the corresponding end of the turnbuckle device on the side wall.

* * * * *